United States Patent [19]
Krofchalk

[11] Patent Number: 5,370,576
[45] Date of Patent: Dec. 6, 1994

[54] SIDEWALL VENT-MOUNTED FAN ASSEMBLY FOR A TRUCK CAB

[75] Inventor: Gary F. Krofchalk, Rockwall, Tex.

[73] Assignees: Eleanor L. Sackett, Stewartville; Jon W. Krofchalk, Winona, both of Minn.

[21] Appl. No.: 4,124

[22] Filed: Jan. 13, 1993

[51] Int. Cl.⁵ ............................................. B60H 1/26
[52] U.S. Cl. ................................ 454/143; 454/154; 454/158; 454/338
[58] Field of Search ............... 454/84, 108, 109, 112, 454/143, 151, 158, 207, 208, 338

[56] References Cited

U.S. PATENT DOCUMENTS

| | | | |
|---|---|---|---|
| 1,898,859 | 2/1933 | Thorp | 454/158 X |
| 2,008,965 | 7/1935 | Miller | 454/208 |
| 2,582,356 | 1/1952 | Rauhut | 454/207 X |
| 2,619,021 | 11/1952 | Pfautsch | 454/338 X |
| 2,640,411 | 6/1953 | Hans . | |
| 3,018,711 | 1/1962 | Welch et al. | 454/154 |
| 3,195,440 | 7/1965 | Coscione et al. | 454/158 X |
| 3,532,377 | 10/1970 | Grasseler | 296/28 |
| 3,603,238 | 9/1971 | Anderson | 454/143 X |
| 4,088,364 | 5/1978 | Termont | 296/28 C |
| 4,120,527 | 10/1978 | Lawrence | 296/28 C |
| 4,580,486 | 4/1986 | Schulz . | |

FOREIGN PATENT DOCUMENTS 363152 12/1931 United Kingdom ............... 454/338

Primary Examiner—Harold Joyce
Attorney, Agent, or Firm—Konneker Bush Hitt & Chwang

[57] ABSTRACT

A forced flow of outside ventilation air may be selectively directed into the cab of a truck using a specially designed fan assembly that works in conjunction with an existing vent structure disposed within a ventilation passage extending through a wall of the cab. The existing vent structure has a control member which is manually operable from the interior of the cab to selectively permit or preclude outside air inflow to the cab interior through the ventilation passage. The fan assembly includes a housing having an open front side, and an open rear side secured to the cab wall portion over the inner side of the ventilation passage. A cover plate having a pair of air flow openings therein is secured to the front side of the housing for pivotal movement relative thereto between a closed position in which the cover plate blocks the front housing side, and an open position providing manual access to the vent structure control member through the housing interior. Mounted on the inner side of the cover plate, over its air flow openings, are a pair of small ventilation fans. With the cover plate in its closed position and the vent structure opened, operation of the ventilation fan draws outside air inwardly through the vent structure and the ventilation passage and forces the outside air into the interior of the cab.

7 Claims, 3 Drawing Sheets

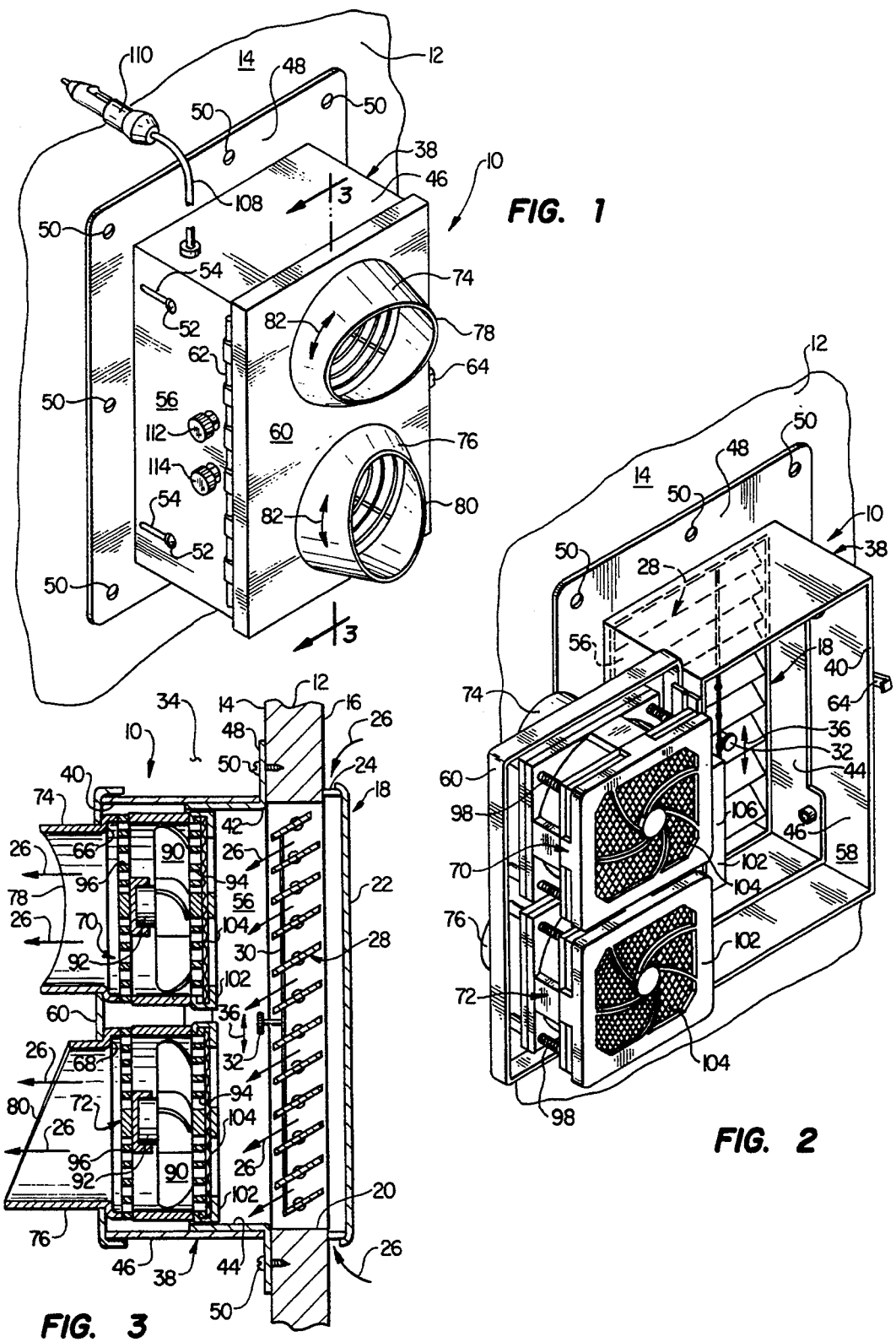

SIDEWALL VENT-MOUNTED FAN ASSEMBLY FOR A TRUCK CAB

BACKGROUND OF THE INVENTION

The present invention generally relates to air ventilating equipment, and more particularly relates to apparatus and methods for ventilating the interior of a truck cab which may include a sleeper compartment.

During both short rest stops and overnight sleeping stops in warm weather it is quite common for truck drivers to leave their truck engines idling to power the truck's air conditioning system so that the interior of the cab is maintained at a desirably cooled temperature. This continuous engine idling, of course, wastes fuel and tends to shorten the operating life of the engine. Over a given year it is not uncommon for the engine to be kept at idle for this limited purpose for 200 to 300 hours per month.

Various alternatives have heretofore been proposed to eliminate, or at least substantially reduce, the need for such sustained periods of engine idling. One approach has been to provide a temperature control system which, during rest or sleep stops, cycles the truck engine (and thus the cab air conditioning system) on and off as needed to maintain a predetermined cooled temperature within the cab. While this method uses less fuel, it is still fuel inefficient and increase the wear and tear on the engine and starter due to the many additional engine start-ups required.

Another approach has been to provide a small fuel-powered auxiliary engine which, with the truck engine off, powers only the cab air conditioning system during rest and sleep stops. While this method eliminates the excessive main engine idling problem., it still can use considerable fuel, and additionally increases the overall expense and complexity of the truck's mechanical and electrical systems.

Yet another scheme for cooling the truck cab during rest and sleep stops has been to simply turn off the truck engine and rely on the vent structures typically installed in ventilation passages in the sleeper compartment exterior walls, or other exterior walls of the cab, to provide cooling outside air ventilation to the cab interior. Vent structures of this type are manually adjustable from the interior of the cab to selectively permit or preclude outside air flow into the cab via the ventilation passages, and may be pivotable blade louver structures, or dual sliding plate structures with alignable air flow openings therein.

These manually operable vent structures provide a simple and quite inexpensive alternative to the conventional use of an idling truck engine to power the cab air conditioning system. However, this alternate approach to cab cooling has proven to be less than entirely satisfactory for several reasons. For example, the amount of outside ventilation air entering the typical vent structure when the truck is stopped tends to be quite small. Accordingly, only a minimal cooling effect is achieved which may not be sufficient in hot weather. Additionally, when a conventional vent structure of this type is opened for cooling ventilation purposes it forms an opening through which all types of insects may enter the cab. Placing a screen or filter over the vent structure can eliminate this problem, but also greatly reduces the amount of outside cooling air which can enter the cab.

It can be readily be seen that a need exists for improved apparatus and methods for cooling and ventilating a truck cab during rest and sleep stops which eliminate or at least substantially reduce the above-mentioned problems, limitations and disadvantages typically associated with conventional truck cab ventilation and cooling approaches. It is accordingly an object of the present invention to provide such improved apparatus and methods.

SUMMARY OF THE INVENTION

In carrying out principles of the present invention, in accordance with a preferred embodiment thereof, a specially designed fan assembly is provided for use in conjunction with a conventional truck cab vent structure to provide a forced flow of outside ventilation air into the interior of the cab. The existing vent structure is disposed within a ventilation passage extending between the inner and outer side surfaces of a sleeper compartment exterior wall, or another exterior wall portion of the cab, and is provided with control means manually operable from inside the cab to selectively cause the vent structure to permit or preclude outside air flow into the cab through the ventilation passage.

The fan assembly comprises a housing having open front and rear sides, and means for securing the rear housing side to the interior side of the cab wall portion over the interior side of its ventilation passage. A cover plate having an air flow opening extending therethrough is secured to the front housing side for pivotal movement relative thereto between a closed position in which the cover plate extends across and blocks the front housing side, and an open position permitting manual access to the vent structure control means via the interior of the housing.

A ventilation fan secured to the inner side of the cover plate over its air flow opening is operative to selectively create a forced flow of outside ventilation air into the cab, via the cab ventilation passage, when the cover plate is in its closed position and the existing vent structure is opened. In a preferred embodiment thereof, the fan has an electric motor which, by means of a suitable power supply cord, may be conveniently plugged into the cab's cigarette lighter. Alternatively, the fan motor may be hard wired into the truck's electrical system.

With the vent structure in its closed position, the ventilation fan may be used by simply pivoting the fan housing cover plate to its open position, reaching into the housing and adjusting the control means to open the vent structure, closing the cover plate, and then turning the fan on. When neither forced ventilation of the cab nor natural outside air inflow through the cab ventilation passage is desired, the fan is turned off, the cover plate is swung open to permit the open vent structure to be manually closed, and the cover plate is returned to its closed position.

The fan assembly thus augments the existing cab vent structure, to provide a forced flow of outside ventilation air to the cab interior, without interfering with the operation of the vent structure. According to other features of the invention, an insect screen or an air filter member is removably secured to the ventilation fan over its inlet side, and the cover plate air outlet opening is fitted with an adjustable air outlet member that may be rotated to selectively adjust the discharge direction of outside ventilation air delivered to the cab by the fan.

In a preferred embodiment of the fan assembly, the housing cover plate is provided with two air outlet openings, and two small ventilation fans are mounted on the inner side of the cover plate over these air outlet openings. While in the preferred embodiment of the fan assembly, its ventilation fans are operative to provide a forced inflow of outside air into the cab interior, it will be readily appreciated that the operative air flow direction of the fans could be reversed. With this modification in effect the fan assembly could be utilized as an exhaust unit, in conjunction with an open vent structure in an opposite cab wall portion, to provide a cross flow of ventilating air through the cab interior.

According to another feature of the invention, the fan assembly housing includes a frame-like base member which defines the open rear side of the housing, and a body portion which is removably securable to the base portion and defines the open front side of the housing. A peripheral flange extends around the base portion and is removably securable to the inner side of the cab around the inner side of its ventilation passage. By simply widening or narrowing the width of the peripheral flange as needed, the overall fan assembly housing may be operatively secured over ventilation passages of varying sizes.

BRIEF DESCRIPTION OF THE DRAWING

FIG. 1 is a perspective view of a fan assembly embodying principles of the present invention and used to provide a forced flow of outside ventilation air to the interior of a truck cab, the fan assembly being shown with a front cover plate portion thereof in its closed position;

FIG. 2 is a perspective view similar to that in FIG. 1, but with the front fan assembly cover plate in an opened position thereof;

FIG. 3 is an enlarged scale cross-sectional view through the fan assembly taken along line 3—3 of FIG. 1 and illustrating the manner in which the fan assembly cooperates with an existing cab vent structure to provide a forced outside ventilation air flow to the cab interior;

DETAILED DESCRIPTION

Figure 4:
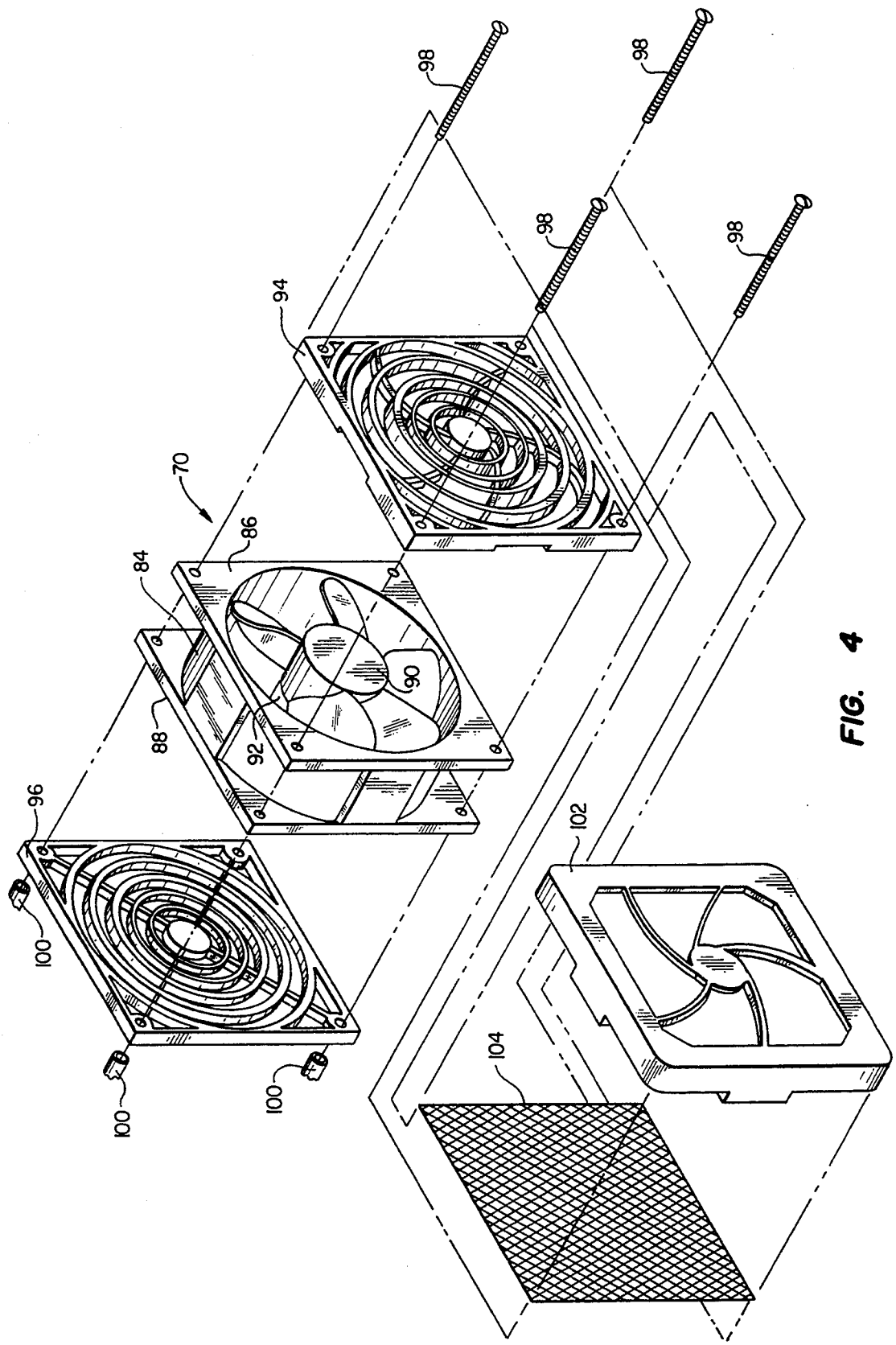
FIG. 4 is an enlarged exploded perspective view of one of the two ventilating fan portions of the fan assembly.

Referring now to the drawing wherein like reference numerals designate the same or similar elements throughout the several views, as may be seen in FIGS. 1-3 of the drawings, the present invention provides a specially designed fan assembly 10 that is operative to provide a forced flow of outside ventilation air to the interior of a truck cab having a door 12, or other exterior wall portion, with inner and outer side surfaces 14 and 16. Fan assembly 10 is utilized in conjunction with a conventional vent structure 18 secured within a rectangular ventilation passage 20 extending through the cab wall portion between its inner and outer sides.

Representatively, the conventional vent structure 18 includes a weather shield plate 22 secured to the outer side 16 of the cab wall 12 in an outwardly spaced relationship therewith, and defining a peripheral inlet opening 24 through which outside air 26 may enter the door ventilation passage 20 as shown in FIG. 3. Secured within the ventilation passage 20 is a louver structure having individually pivoted blades that are intersecured with a vertical rod to which a control knob 32 is connected.

As the vent structure 18 is normally utilized, the control knob 32 is manually accessible from the interior 34 of the cab and is vertically movable (as indicated by the double-ended arrow 36) to selectively close the louver structure 28, or to open it to permit a natural flow of outside air 26 into the cab. Alternatively, the representative louver structure could be a pair of side-by-side sliding plates having alignable air inlet openings therein.

The fan assembly 10 includes a rectangular housing 38 having open front and rear sides 40 and 42, the housing being formed from a rectangular, generally frame-like base portion 44, and a rectangular body portion 46. Base portion 44 defines the open rear side 42 of the housing and has a rear side peripheral flange 48 which is removably secured to the inner side 14 of the cab wall 12, over the inner side of the ventilation opening 20, by screws 50. The rear side of the housing body portion 46 is fitted over the base portion 44 and removably secured thereto by screws 52 extending through slots 54 formed in the vertical side walls 56,58 of the housing body portion 46.

A door or cover plate 60 is secured to the front edge of the vertical housing wall 56, by a hinge 62, for pivotal movement relative to the housing between a closed position (FIGS. 1 and 3) in which the cover plate extends across and blocks the open front side 40 of the fan assembly housing 38, and an open position (FIG. 2) in which the cover plate 60 permits manual adjustment access to the vent structure control knob 32 through the interior of the housing 38. A latch structure 64 on the right side of the housing is operative to releasably secure the cover plate 60 in its closed position. Circular upper and lower air flow openings 66,68 (see FIG. 3) are formed through the cover plate 60.

Mounted on the interior side of the cover plate 60, respectively over the upper and lower air flow openings 66 and 68, are a pair of small ventilating fans 70 and 72 operative to flow air outwardly through the openings 66 and 68. Air flow adjustment members 74 and 76, having sloped, open outer ends 78 and 80, are rotatably secured to the cover plate 60 over its air flow openings 66,68. As indicated by the double-ended arrows 82 in FIG. 1, each of the members 74,76 may be rotated to independently adjust the air discharge direction of its associated ventilating fan. With the cover plate 60 in its closed position (FIG. 3) each of the fans 70,72 is compactly disposed within the fan assembly housing 38.

Using the upper fan 70 as an example, the construction of each of the identical fans 70,72 will now be described with reference to FIG. 4. Fan 70 includes a hollow fan support member 84 having an open rectangular inlet side 86 and an open rectangular outlet side 88. Disposed within the interior of the member 84 are an axial fan impeller 90 rotatably connected to a small electric fan motor 92. Inlet and outlet grille members 94,96 respectively abut the inlet and outlet sides 86 and 88 and are held in place thereon by mounting bolts 98 extending through corresponding openings in the components 84,94,96 and threaded into hollow bosses 100 projecting inwardly from the inner side of the cover plate 60. An open rectangular support member 102 retains an insect screen or filter member 104 and is removably snapped over the right side of the inlet grille 94 to retain the member 104 over the inlet side of the fan 70.

Returning now to FIGS. 1–3, the fan assembly 10 also includes an electrical controller 106 (FIG. 2) mounted on the interior of the fan assembly housing 38. Controller 106 is electrically connected to the fan motors 92 and a power supply cord 108 having an outer end portion 110 (FIG. 1) that may be conveniently be plugged into the cab's cigarette lighter to provide 12 V DC power to the fan motors via the controller 106. Alternatively, the controller 106 may be hard wired into the truck's electrical system if desired.

Mounted on the vertical side wall 56 of the fan assembly housing 38 are upper and lower fan control knobs 112,114 (FIG. 1) that are operatively connected to the controller 106 and may be respectively rotated to turn the upper and lower fans 70,72 on and off and independently vary their operating speeds as desired.

To use the fan assembly 10 in conjunction with the existing vent structure 18 over which it is mounted, the housing cover plate 60 is swung open, the driver reaches into the housing 38 and adjusts the control knob 32 to open the vent structure 18, closes the cover plate 60, and then turns the fans 70,72 on and appropriately adjusts their speeds and discharge directions. In this manner a cooling forced ventilation flow of outside air 26 is delivered into the interior of the cab without the necessity of starting the truck engine to operate the main air conditioning system.

To subsequently terminate outside air inflow through the ventilation passage 20, the driver simply turns the fans 74,76 off, opens the cover plate 60, manually operates the control knob 32 to close the vent structure 18, and then shuts the cover plate 60.

It can be seen that the fan assembly 10 provides a relatively inexpensive cooling and ventilating alternative to the usual practice of using an idling truck engine simply to operate the truck's air conditioning system during rest or sleep stops. The fan assembly may be easily and quickly installed over the existing vent structure 18 for operation in conjunction therewith to provide a forced inflow of outside cooling and ventilating air to the cab interior.

Due to the previously described two-piece construction of the fan assembly housing 38, the fan assembly 10 can be retrofitted over existing cab vent structures of varying sizes simply by widening the housing flange 48 as necessary to accommodate, for example, a door ventilation passage of larger cross-sectional area. It will be appreciated that by merely adjusting the size of the mounting flange 48 this ventilation passage size flexibility is desirably achieved without the necessity of altering the size of the balance of the fan assembly.

It will also be appreciated that, if desired, the fans 70,72 could be alternately installed on the cover plate 60 in a manner such that their operative air flow directions are reversed. By making this simple modification, the fan assembly 10 can be converted to an exhaust unit which draws air from within the cab and discharges the air to the outside of the cab. By using such a modified exhaust unit in conjunction with an open vent structure on the opposite side of the cab, a cooling cross-flow of outside ventilation air can be achieved within the cab interior.

In the embodiment of the fan assembly described above, the fan assembly is added to a vent structure already in place within a ventilation passage in a cab wall. Both the fan assembly and a suitable cooperating vent structure can, of course, be originally installed as a unit in a cab door or another exterior wall portion of the cab if desired. This installation may be accomplished by forming a suitable ventilation passage in the selected cab wall portion, operatively securing the fan assembly directly to the vent structure, inserting the vent structure into the ventilation passage, and then securing the fan assembly to the inner side of the cab wall portion.

Figure 5:
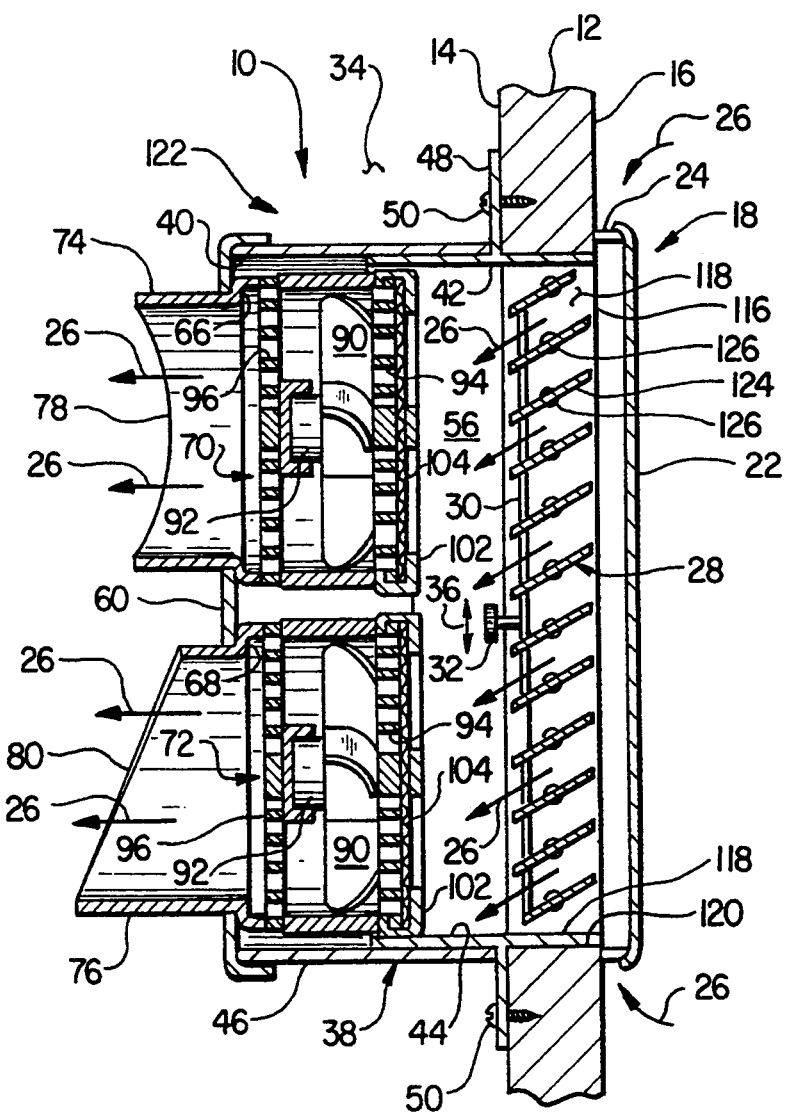
FIG. 5 is an enlarged scale cross-sectional view of an alternated embodiment of the fan assembly of FIG. 3 in which the fan assembly incorporates the vent therein.

Finally, as may be seen in FIG. 5, the fan assembly 10 and vent structure 18 may be assembled as a single combination fan assembly/vent structure unit 122 for installation in an opening 116 in the cab wall 12. In this embodiment of the invention, the rectangular, generally frame-like base portion 44 includes a rectangular, generally frame-like extended portion 118 which, when the combination fan assembly/vent structure unit 122 is installed in the opening 116, extends along an interior sidewall 120 thereof. Preferably, the extended portion 118 should be sized to have a length approximately equal to the thickness of the cab wall 12. The louver structure 28 includes one or more louvers 124, each of which is mounted by a corresponding rotatable shaft 126 to the side portions 118', one of which is visible in FIG. 5, of the extended portion 118. By configuring the invention as a combination fan assembly/vent structure unit 122, it is particularly well suited for installation in vehicles without an existing vent structure suitable for use with the disclosed fan assembly. Here, it is contemplated that an opening such as the opening 116 would be formed in the selected cab wall portion 12, the extended portion 118 of the combination fan assembly/vent structure 122 inserted into the opening 116, thereby inserting the vent structure portion within the selected wall portion and then mounting the combination fan assembly/vent structure 122 by securing the mounting flange 48 to the inner side 14 of the cab wall portion 12.

The foregoing detailed description is to be clearly understood as being given by way of illustration and example only, the spirit and scope of the present invention being limited solely by the appended claims.

What is claimed is:

1. Apparatus for creating a forced ventilation air flow within a truck cab having a wall portion with exterior and interior side surfaces, a ventilation passage extending between said exterior and interior side surfaces, and a vent structure disposed within said ventilation passage and being manually adjustable between opened and closed positions to respectively permit and preclude air flow through said ventilation passage, said apparatus comprising:

a housing having a body portion which defines open front and rear sides;

means for securing said body portion of said housing to said interior side surface of said wall portion around the interior side of said ventilation passage;

a cover plate;

a hinge member secured to said cover plate and said body portion of said housing, said hinge member providing for pivotal movement of said cover plate relative to said body portion of said housing between a closed position in which said cover plate extends across and blocks said open front side of said housing and an open position permitting manual adjustment access to said vent structure through said open front side of said housing;

said cover plate having an air flow opening extending therethrough and an inner side which, with said cover plate in said closed position thereof, faces the interior of said housing;

a ventilation fan supported on said inner side of said cover plate over said air flow opening and selectively operable to create a forced flow of outside air through said ventilation passage into the interior of said cab when said vent structure is opened and said cover plate is in its closed position, said ventilation fan having a fan housing and an air inlet side;

a filter member supported on said fan housing and covering said air inlet side of said ventilation fan; and an air discharge member movably secured to said cover plate over said air flow opening therein, said air discharge member being adjustable to selectively vary the air discharge direction of said ventilation fan.

2. Apparatus for creating a forced ventilation air flow within a truck cab having a wall portion with exterior and interior side surfaces, a ventilation passage extending between said exterior and interior side surfaces, and a vent structure disposed within said ventilation passage and being manually adjustable between open and closed positions to respectively permit and preclude air flow through said ventilation passage, said apparatus comprising:

a housing having a body portion which defines open front and rear sides;

means for securing said body portion of said housing to said interior side surface of said wall portion around the interior side of said ventilation passage;

a cover plate;

a hinge member secured to said cover plate and said body portion of said housing, said hinge member providing for pivotal movement of said cover plate relative to said body portion of said housing between a closed position in which said cover plate extends across and blocks said open front side of said housing and an open position permitting manual adjustment access to said vent structure through said open front side of said housing;

said cover plate having an air flow opening extending therethrough and an inner side which, with said cover plate in said closed position thereof, faces the interior of said housing;

a ventilation fan supported on said inner side of said cover plate over said air flow opening and selectively operable to create a forced flow of outside air through said ventilation passage into the interior of said cab when said vent structure is opened and said cover plate is in its closed position, said ventilation fan having a fan housing and an air inlet side;

a screen member supported on said fan housing and covering said air inlet side of said ventilation fan; and an air discharge member movably secured to said cover plate over said air flow opening therein, said air discharge member being adjustable to selectively vary the air discharge direction of said ventilation fan.

3. Apparatus for creating a forced ventilation air flow within a truck cab having a wall portion with exterior and interior side surfaces, a ventilation passage extending between said exterior and interior side surfaces, and a vent structure disposed within said ventilation passage and being manually adjustable between open and closed positions to respectively permit and preclude air flow through said ventilation passage, said apparatus comprising:

a housing having a body portion which defines open front and rear sides;

a peripheral flange portion extending around said open rear side of said housing and removably securable to said interior side surface of said wall portion for securing said rear side of said housing to said interior side surface of said wall portion around the interior side of said ventilation passage;

a frame-like base portion on which said peripheral flange is formed;

said body portion removably securable to said base portion;

a cover plate;

a hinge member secured to said cover plate and said body portion of said housing said hinge member providing for pivotal movement of said cover plate relative to said body member between a closed position in which said cover plate extends across and blocks said open front side of said housing and an open position permitting manual adjustment access to said vent structure through said open front side of said housing;

said cover plate having an air flow opening extending therethrough and having an inner side which, with said cover plate in said closed position thereof, faces the interior of said housing;

a ventilation fan supported on said inner side of said cover plate over said air flow opening and selectively operable to create a forced flow of air through said ventilation passage when said vent structure is opened and said cover plate is in its closed position, said ventilation fan having a fan housing and an air inlet side; and a screen member supported on said fan housing and covering said air inlet side of said ventilation fan.

4. Apparatus for creating a forced ventilation air flow within a truck cab having a wall portion with exterior and interior side surfaces, a ventilation passage extending between said exterior and interior side surfaces, and a vent structure disposed within said ventilation passage and being manually adjustable between open and closed positions to respectively permit and preclude air flow through said ventilation passage, said apparatus comprising:

a housing having a body portion and open front and rear sides;

means for securing said body portion of said housing to said interior side surface of said wall portion around the interior side of said ventilation passage;

a cover plate;

a hinge member secured to said cover plate and said body portion of said housing, said hinge member providing for pivotal movement of said cover plate relative to said body portion of said housing between a closed position in which said cover plate extends across and blocks said open front side of said housing and an open position permitting manual adjustment access to said vent structure through said open front side of said housing;

said cover plate having an air flow opening extending therethrough and having an inner side which, with said cover plate in said closed position thereof, faces the interior of said housing;

a ventilation fan supported on said inner side of said cover plate over said air flow opening and selectively operable to create a forced flow of outside air through said ventilation passage into the interior of said cab when said vent structure is opened and said cover plate is in its closed position, said ventilation fan having a fan housing and an air inlet side; and a filter member supported on said fan housing and covering said air inlet side of said ventilation fan.

5. The apparatus of claim 4 wherein:

said ventilation fan is selectively operable to create a forced flow of outside air through said ventilation passage into the interior of said cab.

6. The apparatus of claim 5 wherein:

said apparatus further comprises an air discharge member movably secured to said cover plate over said air flow opening therein, said air discharge member being adjustable to selectively vary the air discharge direction of said ventilation fan.

7. The apparatus of claim 4 wherein:

said body portion includes a peripheral flange portion extending around said open rear side of said housing.

* * * * *